United States Patent [19]

Folkening et al.

[11] Patent Number: 4,939,339
[45] Date of Patent: Jul. 3, 1990

[54] APPARATUS FOR QUICK DISCONNECT OF AN ARC WELDER TORCH

[75] Inventors: Bobby W. Folkening; Ronald R. Stringer, both of San Jose, Calif.

[73] Assignee: FMC Corporation, Chicago, Ill.

[21] Appl. No.: 332,318

[22] Filed: Apr. 3, 1989

[51] Int. Cl.$^5$ .............................................. B23K 9/00
[52] U.S. Cl. ............................ 219/137.63; 219/137.62
[58] Field of Search ...................... 219/137.31, 137.63, 219/61, 137.62

[56] References Cited

U.S. PATENT DOCUMENTS 4,142,085  2/1979  Knipstrom et al. .................... 219/61
4,210,796  7/1980  Moerke ............................ 219/137.63

Primary Examiner—Clifford C. Shaw
Attorney, Agent, or Firm—Lloyd B. Guernsey; R. C. Kamp; R. B. Megley

[57] ABSTRACT

Apparatus for the quick connect and disconnect of a welding and a cutting torch includes a plurality of quick connectors. An outer portion of a quick connector carries electrical current which provides electrical power for an electric arc welder and an axial bore in the connector carries a liquid to provide cooling of the torch. Other quick connectors carry gas or liquid between the torch and sources of supply.

3 Claims, 2 Drawing Sheets

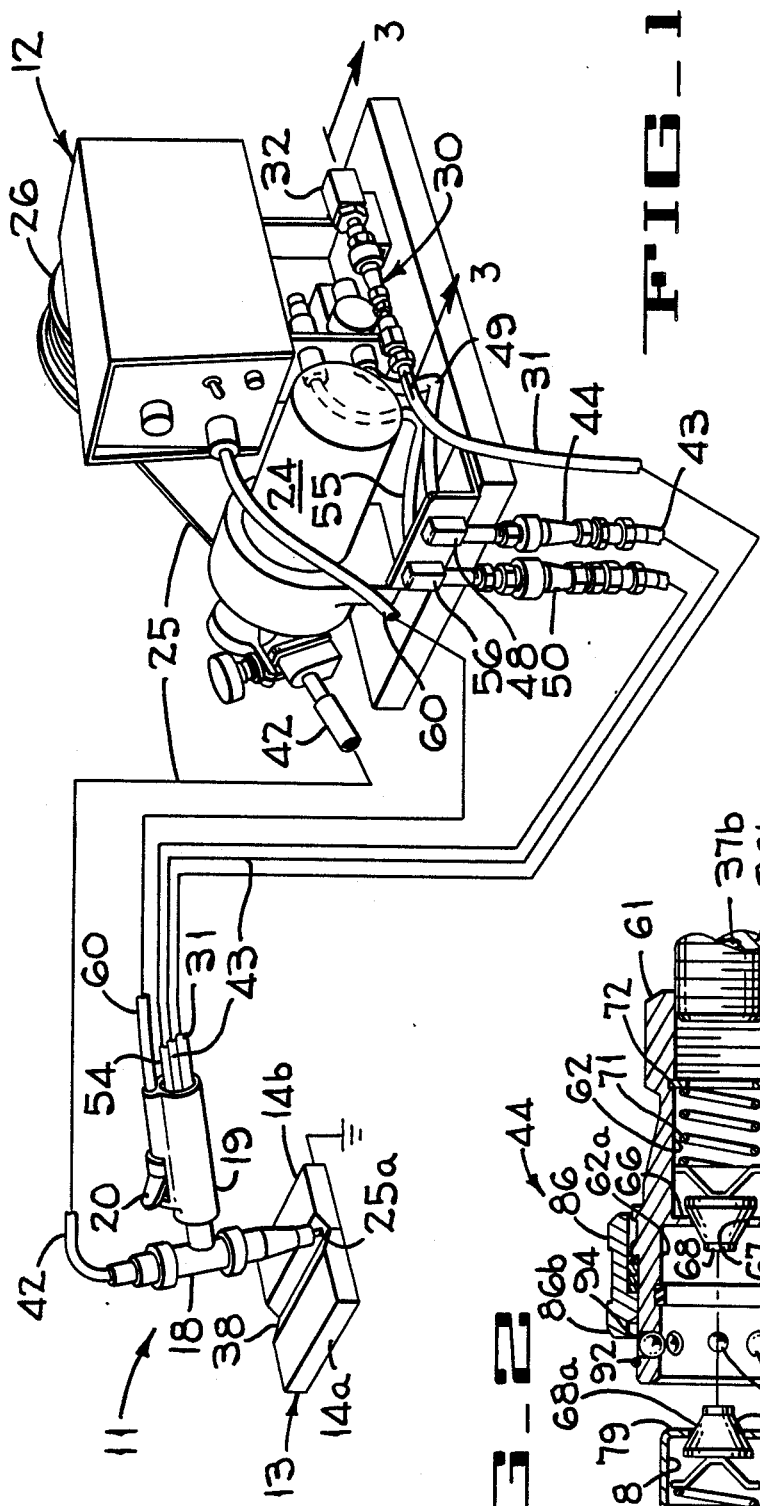
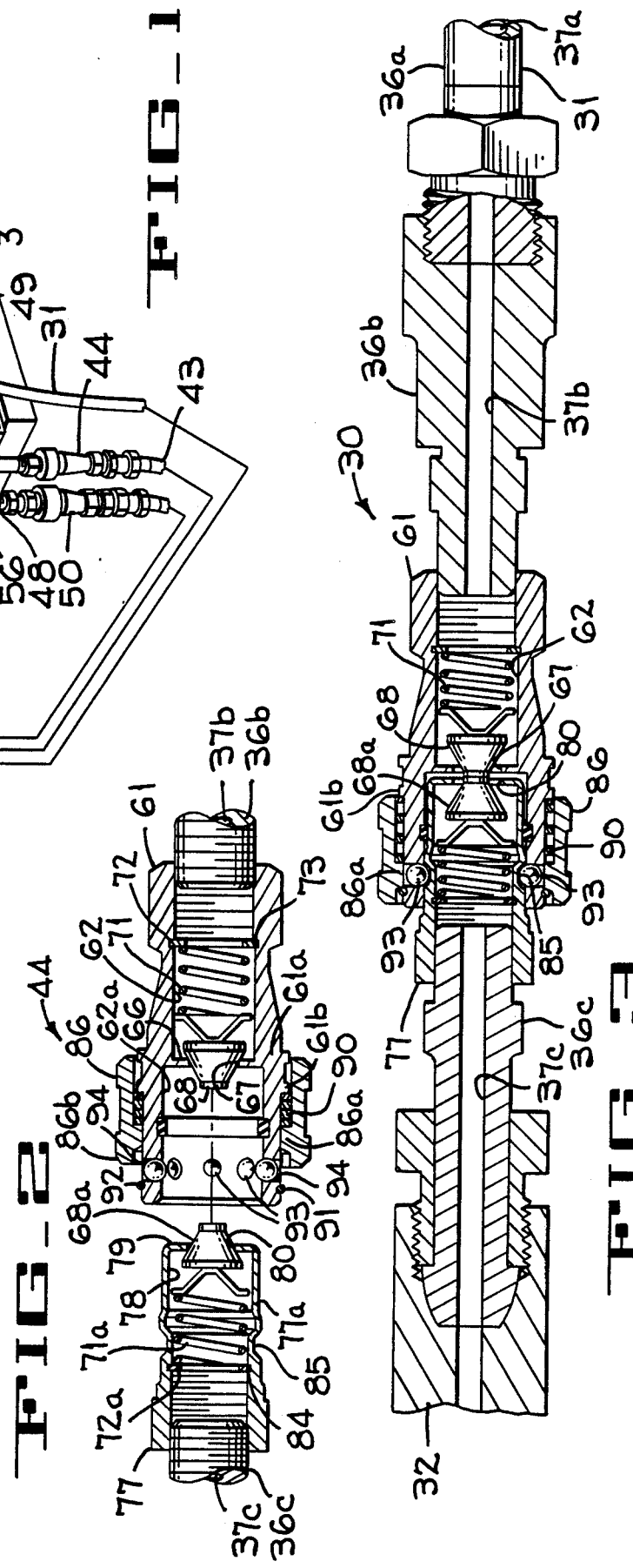

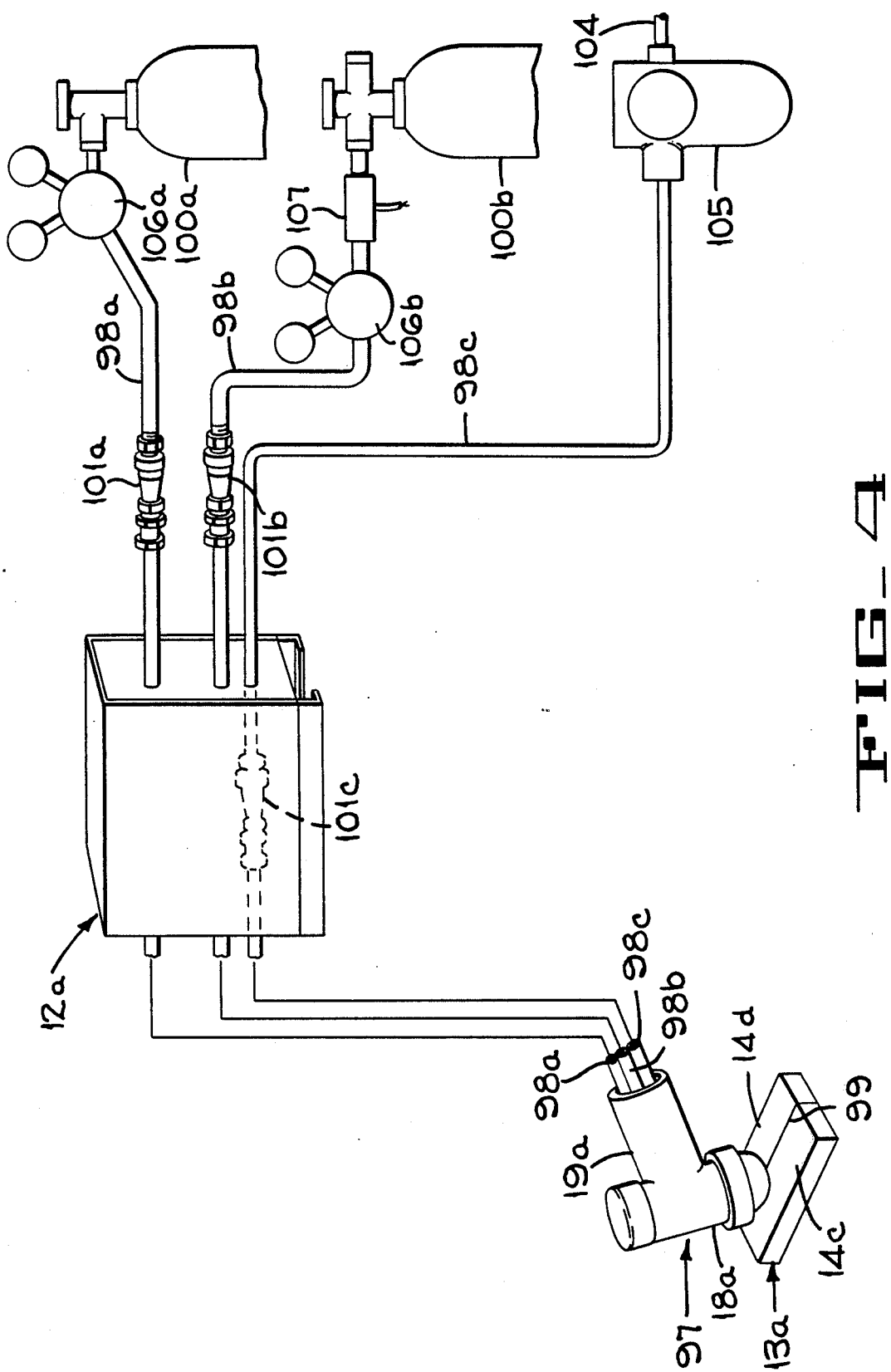

APPARATUS FOR QUICK DISCONNECT OF AN ARC WELDER TORCH

BACKGROUND OF THE INVENTION

The present invention disclosures apparatus for welding a metal workpiece, and more particularly, apparatus for the quick connect and disconnect of a welding torch from a power supply control to facilitate rapid replacement of a welding torch.

Electrical welders employ a torch having an axially extending passage for the movement of a consumable electrode from a reel or other source through the passage to a position adjacent to a workpiece to be welded. An electrical power supply connected between the electrode and the workpiece provides an electrical current which forms an arc to heat the electrode and the adjacent workpiece. The electrode melts and is deposited in liquid form on the workpiece. Heat from the arc also melts a portion of the workpiece which enables the melted electrode to better adhere to the surface of the workpiece and increased the strength of the weld when two pieces of material are being welded together. A motor feeds the electrode from the reel to replenish the electrode (wire) and the electrode is deposited on the workpiece. A cooling liquid is supplied to the welding torch to keep the torch relatively cool and prevent damage from the heat of the welding operation. An inert gas is also supplied to the torch for flooding the area of the workpiece adjacent to the arc to prevent oxidation of the welding material and of the surface of the workpiece. Hoses are connected between a power supply control unit and the welding torch to supply the inert gas, electrical power, cooling liquid and for returning the cooling liquid to the power supply control.

SUMMARY OF THE INVENTION

The present invention discloses apparatus for the quick connection and disconnection of a welding torch from a welder power supply control. A first quick connector connected between a gas outlet lead on the power supply control and a gas input lead on the torch selectively provides the inert gas to prevent oxidation of welding material and of the surface of a workpiece. A second quick connector mounted between a water output/electrical output lead on the power supply control and a water input/electrical input lead on the torch provides both electrical power and water for cooling the torch. The second quick connector supplies water through a center bore along the length of the connector and supplies electrical current along an outer portion of the second connector. A third quick connector mounted between a water output lead on the torch and a water return lead on the power supply control returns water to the power supply control. Each of the connectors includes a male portion and a female portion, which portions can be quickly snapped together and locked in place. An axial bore interconnects the male and female portions when the portions are locked in place to allow gas, liquid and electricity to flow between the male and female portions. A valve in each of the male and female portions closes the axial bores to prevent leakage of gas and liquid when the portions are disconnected.

BRIEF DESCRIPTION OF THE DRAWINGS

FIG. 1 is a perspective drawing illustrating the connectors between a welding torch and a power supply control.

FIG. 2 is a sectional view of one of the quick connectors with the male and female portions being disconnected.

FIG. 3 is a sectional view taken along line 3—3 of FIG. 1 with the male and female portions interconnected.

FIG. 4 is a perspective drawing of another embodiment of the present invention showing the connectors between a plasma arc cutting torch and a power supply control.

DESCRIPTION OF THE PREFERRED EMBODIMENT

FIG. 1 discloses an electrical arc welder having a welding torch 11 and a power supply control 12 for welding a workpiece 13 comprising a pair of metal plates 14a, 14b. Torch 11 includes a hollow body 18 and an attached handle 19 having a switch 20 mounted thereon. Switch 20 controls the operation of a motor 24 which selectively feeds a consumable wire electrode 25 to torch 11 from a reel 26 rotatably mounted on power supply control 12. Electrical power to provide an arc between workpiece 13 and a lower end of wire electrode 25 is coupled to torch 11 by a quick connector 30 and by a water output/electrical output lead 31. Connector 30 is connected to a terminal 32 which, in turn, is connected to a source of electrical power (not shown) and to a pressurized source of water (not shown). Connector 30 and lead 31 each have an outer portion 36a, 36b, 36c (FIG. 3) for carrying the electrical current and an axial bore 37a, 37b, 37c for carrying water or other fluid to cool torch 11.

When a lower end 25a of the consumable electrode (FIG. 1) is positioned adjacent to a groove 38, and a voltage from output lead 31 is supplied to electrode 25, an arc between the electrode 25 and workpiece 13 melts the lower end 25a of electrode 25 and deposits the melted material in groove 38. In addition, heat from the arc also melts a portion of the metal plates 14a, 14b which fuses these plates together when they cool to provide additional strength to join plates 14a, 14b. The motor 24 feeds the wire 25 through a wire guide 42 and through body 18 of the torch at a steady rate to supply material for filling the groove 38 as the electrode 25 is moved along the groove 38.

Inert gas to flood the area of the workpiece 13 (FIG. 1) to prevent oxidation of the welding material and of the surface of workpiece 13 is supplied to the hollow body 18 by a gas input lead 43 through a quick connector 44. Quick connector 44 is connected by a terminal 48 and a gas output lead 49 to a source of inert gas (not shown). Another quick connector 50, a pair of water return leads 54, 55 and a terminal 56 return the water from torch 11 to a radiator (not shown) for cooling and for recycling the water back to torch 11. Switch 20 is coupled to power supply control 12 by a signal lead 60 and controls the feed operation of motor 24.

A cross-sectional view of quick connector 44 is disclosed in FIG. 2. Connector 44 includes a female body portion 61 having an axial bore 62 with a restriction 66 in bore 62. Restriction 66 has an opening 67 with a conical shaped valve 68 biased into the opening 67 by a coil spring 71 which presses against a retaining ring 72 mounted in an annular groove 73 in body portion 61. An enlarged axial bore 62a of body portion 61 is adapted to receive a portion of a sleeve or male body portion 77. Sleeve 77 includes an axial bore 78 with a restriction 79 having an opening 80, with a conical shaped valve 68a biased into opening 80 by a coil spring 71a which presses against a retaining ring 72a mounted in an annular groove 84 in sleeve 77. When portions 61, 77 are separated as shown in FIG. 2 valves 68, 68a prevent fluid from flowing through openings 67, 80. An outer annular groove 85 in sleeve 77 facilitates locking sleeve 77 to body portion 61.

A sleeve 86 is mounted around an enlarged end portion 61a of body portion 61. A spring 90 is mounted between an inwardly extending flange 86a on sleeve 86 and an outwardly extending flange 61b on body portion 61 to bias sleeve 86 toward the left as seen in FIG. 2. A retaining ring 91 mounted in an annular groove 92 of body portion 61 retains sleeve 86 on end portion 61a of body portion 61. A plurality of metal balls 93, each mounted in a hole 94 are used to interlock sleeve 77 and body portion 61. Holes 94 each have a small diameter adjacent to bore 62 of body portion 61 to prevent balls 93 from moving into bore 62 and a lip 86b prevents balls 93 from moving radially outward from holes 94.

When sleeve 86 is pulled into the position shown in FIG. 2 the right end portion 77a of sleeve 77 can be inserted into a portion of bore 62 as shown in connector 30 of FIG. 3. When sleeve 86 is released, spring 90 moves sleeve 86 to the left so flange 86a presses balls 93 into groove 85 on sleeve 77 thereby locking sleeve 77 and body portion 61 together. Valves 68, 68a press against each other so valve 68 no longer closes opening 67 and valve 68a no longer closes opening 80, and fluid or gas is free to flow between axial bores 37b and 37c as shown in FIG. 3. Connector 30 of FIG. 3 includes the same body portions 61, 77 disclosed in FIG. 2 and also shows details of the means of connection to terminal 32 and lead 31.

Another embodiment of the apparatus for quick disconnect of arc torches from a power supply control 12a is disclosed in FIG. 4. A plasma arc cutting torch 97 includes a body 18a and an attached handle 19a with a plurality of input hoses 98a–98c for coupling gas to torch 97. Torch 97 provides a plasma arc for cutting a kerf 99 in a workpiece 13a to separate workpiece 13a into a pair of plates 14c, 14d or for cutting a groove in workpiece 13a. A cutting gas from a container 100a coupled through input hose 98a and a connector 101a is ignited by an internal electrode (not shown) inside torch 97 to provide cutting of the material in workpiece 13a and also provides a means for blowing molten material from the kerf 99. A mixture of hydrogen and argon is commonly used for the cutting gas although other gasses can be used. The mixture used should have good heat transfer properties for heating the workpiece and have a relatively high molecular weight to aid in blowing molten metal from a kerf being cut.

A cooling gas from a container 100b is coupled to torch 97 through input hose 98b and a connector 101b to provide cooling of torch 97. For some metals air from a source (not shown) is coupled to torch 97 by an air supply hose 104, an air regulator and filter 105, a connector 101c and input hose 98c to provide cooling of torch 97. When air cooling is used the cooling gas is usually not used. A pair of pressure regulators 106a, 106b provide a predetermined value of pressure of gasses to torch 97. A heater 107 is used to prevent freezing of moisture in the cooling gas as the gas expands.

The present invention discloses apparatus for the quick connect and disconnect of a welding torch or plasma arc torch. This reduces the time required to replace defective equipment and reduces replacement costs.

Although the best mode contemplated for carrying out the present invention has been herein shown and described, it will be apparent that modification and variation may be made without departing from what is regarded to be the subject matter of the invention.

LBG:smb

What is claimed is:

1. Apparatus for quick connect and disconnect of a welding torch from a welder power supply control wherein the power supply control has a gas output lead, a fluid return lead and a fluid output/electrical output lead, and the welding torch has a gas input lead, a fluid outlet lead and a fluid input/electrical input lead, said apparatus comprising:

a first quick connector having a male portion and a female portion for connecting to said male portion, said male portion of said first connector being connected to a power supply control gas output lead and said female portion of said first connector being connected to a torch gas input lead to selectively support gas to said torch;

a fluid output/electrical output lead having an outer portion for carrying an electrical current and an axial bore for carrying fluid, said fluid output/electrical output lead being connected to a power supply control;

a flexible fluid input/electrical input lead having an outer portion for carrying an electrical current and an axial bore for carrying fluid, said fluid input/electrical input lead being connected to a torch;

a second quick connector having a male portion and a female portion for connecting to said male portion, said male and said female portions of said second connector each including an axial bore for conducting fluid through said second connector and said male and said female portions each having an outer portion for carrying an electrical current through said second connector, said male portion of said second connector being connected to said fluid output/electrical output lead of said power supply control and said female portion of said second connector being connected to said fluid input/electrical input lead of said torch to selectively supply fluid and electrical power from said power supply control to said torch; and a third quick connector having a male portion and a female portion for connecting to said male portion, said male portion of said third connector being connected to a fluid return lead of said power supply control and said female portion of said third connector being connected to a fluid outlet lead of said torch to selectively return fluid to said power supply control.

2. Apparatus for quick connect and disconnect as defined in claim 1 wherein each of said male and said female portions of said connectors includes an axial bore for conducting a fluid through said connector and each of said male and said female portions includes a valve in an end portion to allow fluid to flow when said male and said female portions are interconnected and each of said valves prevents fluid flow when said male and said female portions are disconnected.

3. Apparatus for quick connect and disconnect as defined in claim 1 wherein each of said male and said female portions includes: an axial bore for conducting a fluid through said connector, a restriction in said axial bore, a generally conical-shaped valve and means for biasing said conical-shaped valve into said restriction for closing said axial bore when said male and said female portions are disconnected, each of said conical-shaped valves pressing against each other to move a portion of each of said valves away from said restrictions and allow fluid to flow between said male and said female portions when said male and said female portions are interconnected.

* * * * *